US010302144B2

United States Patent
Rudi et al.

(10) Patent No.: US 10,302,144 B2
(45) Date of Patent: May 28, 2019

(54) SLIDING CLUTCH FOR AN ADJUSTMENT DEVICE AND SIDE-VIEW MIRROR FOR A MOTOR VEHICLE HAVING AN ADJUSTMENT DEVICE

(71) Applicant: SMR Patents S.à.r.l., Luxembourg (LU)

(72) Inventors: Artem Rudi, Ludwigsburg (DE); Peter Hein, Denkendorf (DE); Andreas Herrmann, Winnenden-Baach (DE)

(73) Assignee: SMR Patents S.à.r.l., Luxembourg (LU)

( * ) Notice: Subject to any disclaimer, the term of this patent is extended or adjusted under 35 U.S.C. 154(b) by 141 days.

(21) Appl. No.: 15/252,708

(22) Filed: Aug. 31, 2016

(65) Prior Publication Data

US 2017/0058963 A1 Mar. 2, 2017

(30) Foreign Application Priority Data

Sep. 1, 2015 (EP) .................................. 15183334

(51) Int. Cl.
| | | |
|---|---|---|
| *B60R 1/06* | (2006.01) | |
| *F16D 7/04* | (2006.01) | |
| *F16D 43/20* | (2006.01) | |
| *F16D 7/00* | (2006.01) | |

(52) U.S. Cl.
CPC ................ *F16D 7/048* (2013.01); *B60R 1/06* (2013.01); *F16D 7/002* (2013.01)

(58) Field of Classification Search
CPC ... F16D 7/002; F16D 7/02; F16D 7/04; F16D 7/048; F16D 43/202; F16D 43/21–43/213; B60R 1/06
See application file for complete search history.

(56) References Cited

U.S. PATENT DOCUMENTS

| 3,618,310 A | 11/1971 | Balchunas |
| 4,982,926 A | 1/1991 | Mori et al. |
| 5,000,721 A | 3/1991 | Williams |
| (Continued) | | |

FOREIGN PATENT DOCUMENTS

| DE | 102011109375 A1 | 2/2013 |
| DE | 102012001891 A1 | 8/2013 |
| (Continued) | | |

OTHER PUBLICATIONS

European Search Report, Application No. EP 15183334.0, dated Mar. 10, 2016.

*Primary Examiner* — Jacob S. Scott
*Assistant Examiner* — Lillian T Nguyen
(74) *Attorney, Agent, or Firm* — MacMillan, Sobanski & Todd, LLC

(57) ABSTRACT

A sliding clutch for an adjustment device of a rearview device of a motor vehicle comprises two plastic parts. A first part is formed as an external gear wheel having a first multiplicity of first coupling elements and a second part is formed as an internal shaft having a second multiplicity of second coupling elements. The two plastic parts rotate with one another up to a predefined maximum torque namely because a positive fit exists between the first and second coupling elements up to the predefined maximum torque. The invention furthermore relates to a side-view mirror for a motor vehicle having an adjustment device which comprises a sliding clutch according to the invention.

10 Claims, 6 Drawing Sheets

(56) References Cited

U.S. PATENT DOCUMENTS

| | | | |
|---|---|---|---|
| 5,601,491 A | 2/1997 | Chan et al. | |
| 2008/0188315 A1 | 8/2008 | Bosserdet | |
| 2014/0166423 A1* | 6/2014 | Nias | F16D 7/04 |
| | | | 192/56.1 |
| 2015/0016880 A1 | 1/2015 | Nicolai | |

FOREIGN PATENT DOCUMENTS

| | | |
|---|---|---|
| EP | 2159102 A1 | 3/2010 |
| EP | 2230131 A1 | 9/2010 |
| GB | 661643 | 11/1951 |
| GB | 2022199 A | 12/1979 |

* cited by examiner

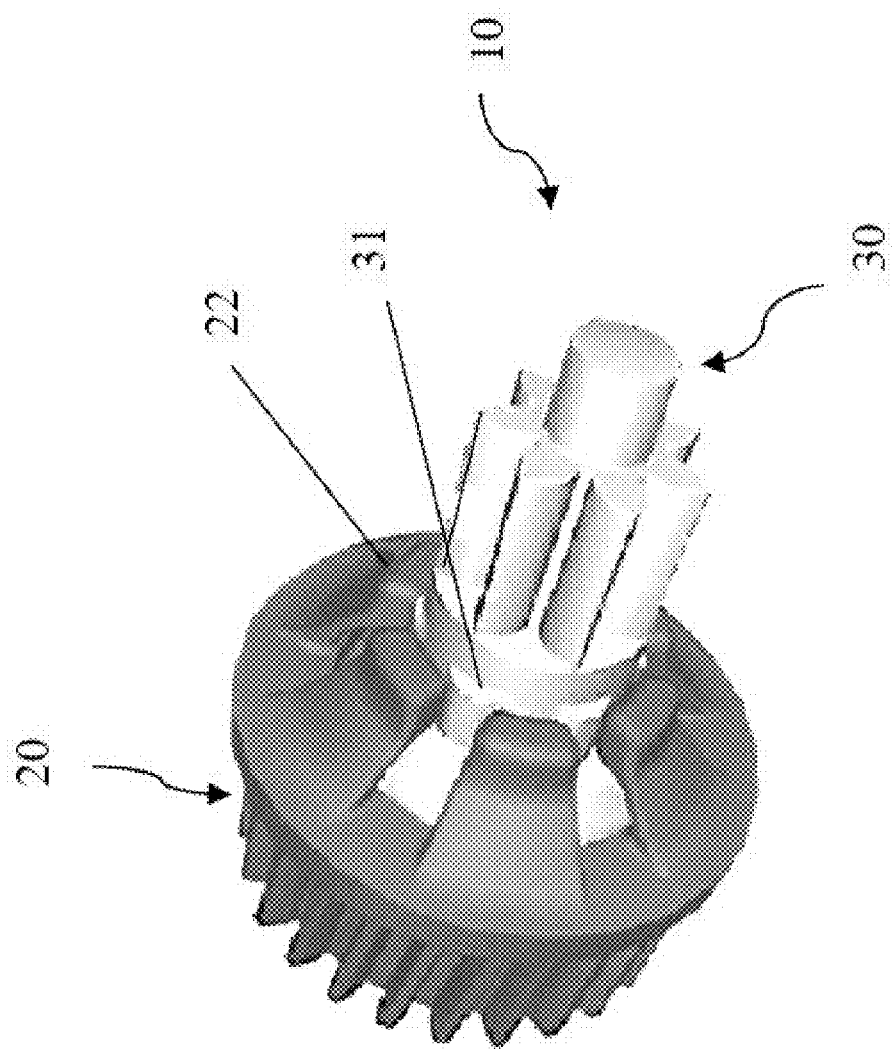

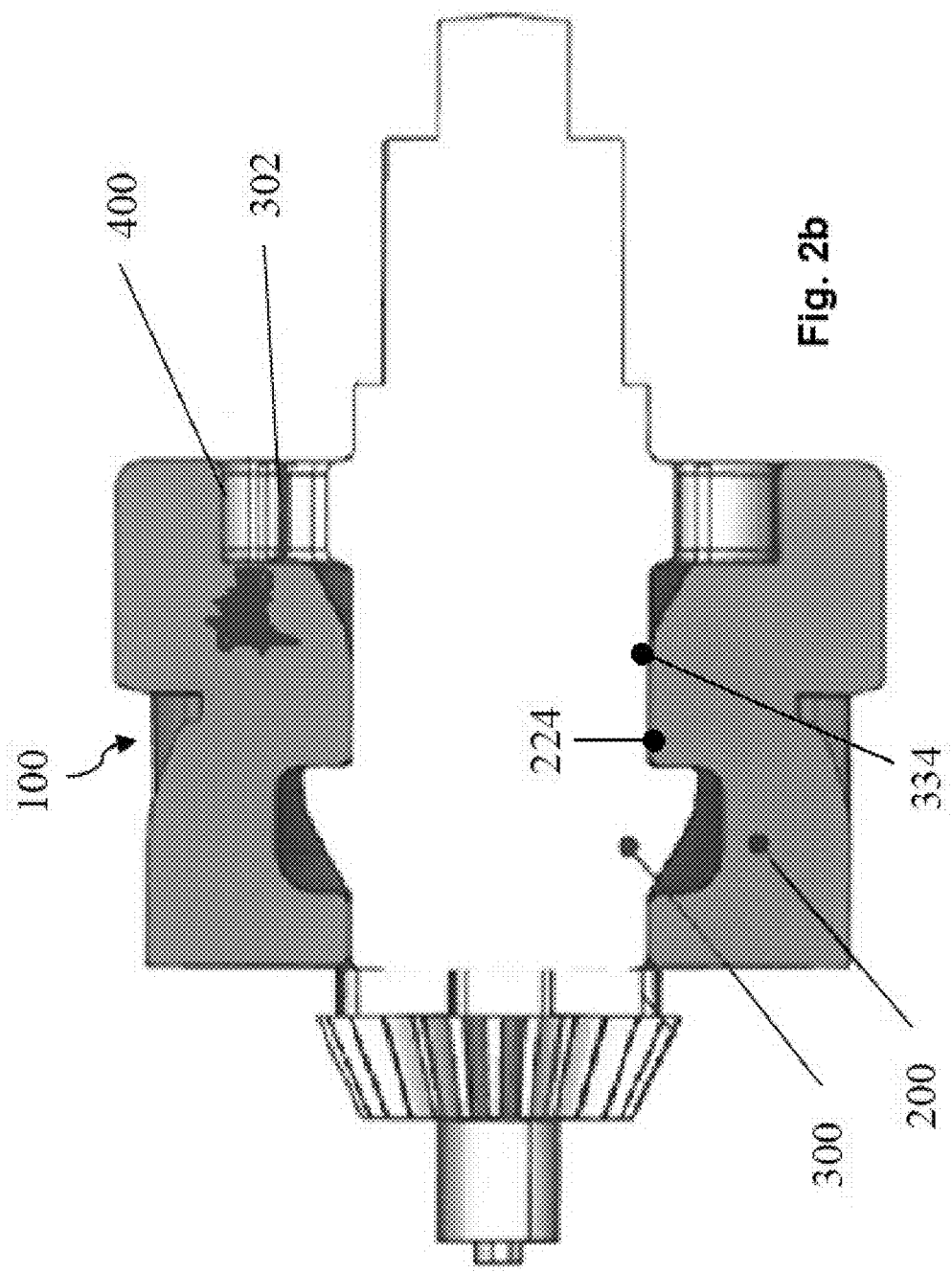

SLIDING CLUTCH FOR AN ADJUSTMENT DEVICE AND SIDE-VIEW MIRROR FOR A MOTOR VEHICLE HAVING AN ADJUSTMENT DEVICE

CROSS-REFERENCE TO RELATED APPLICATIONS

This application claims priority from European Patent Application No. EP 15183334.0, filed Sep. 1, 2015, the disclosure of which is incorporated herein by reference.

BACKGROUND OF THE INVENTION

This invention relates in general to a rearview device of a motor vehicle. In particular, the invention relates to a sliding clutch for an adjustment device of a rearview device of a motor vehicle comprising two plastic parts of which a first part is formed as an external gear wheel having a first multiplicity of first coupling elements and the second part is formed as an internal shaft having a second multiplicity of second coupling elements, wherein the two plastic parts rotate with one another up to a predefined maximum torque, and wherein a positive fit exists between the first and second coupling elements up to the predefined maximum torque.

Such a sliding clutch is known from DE 10 2005 012 652 A1 and is characterized in that the two plastic parts abut one another with planar faces in such a manner that they are in engagement up to the predefined maximum torque due to static friction alone.

Sliding clutches are furthermore known from U.S. Pat. No. 5,000,721 A, US 2008/188315 A1, U.S. Pat. Nos. 3,618,310 A, 4,982,926 A, DE 10 2011 109375 A1, GB 2 022 199 A, GB 661 643 A, DE 10 2012 001891 A1, and U.S. Pat. No. 5,601,491 A.

Adjustment devices for foldable motor vehicle side-view mirrors are diversely known in the state of the art, see e.g. EP 2 159 102 A1 or EP 2 230 131 A1.

It would be desirable to further develop a generic sliding clutch so that it is not only easy to construct, but also so that the setting of the predefined maximum torque is easy to change or adjust.

SUMMARY OF THE INVENTION

This invention relates to a rearview device of a motor vehicle, and in particular, the invention relates to a sliding clutch for an adjustment device of a rearview device of a motor vehicle.

An improved sliding clutch for an adjustment device of a rearview device for a motor vehicle is achieved, according to the invention, by providing a plastic part having the coupling lips made of a plastic having higher elasticity than the plastic part having the coupling lugs.

To this end, it is proposed that 4-50 first and/or second coupling elements are provided, and/or the first coupling elements are configured as coupling lugs and the second coupling elements as coupling lips, or the second coupling elements are configured as coupling lugs and the first coupling elements as coupling lips.

Each coupling lip can be arranged between two adjacent coupling lugs with positive fit, and/or each coupling lip can be formed on a free end of a bending- or spring area.

It is preferred that the cross section of each coupling lug have the shape of an isosceles trapezoid of height h and an angle β of less than 90° on its free end.

It can additionally be provided that the two plastic parts are either produced in a mold, preferably in a 2K injection molding process, or that the shaft is built into the gear wheel.

Sliding clutches according to the invention are also characterized in that the maximum torque is determined by the geometry of the coupling lips and/or the coupling lugs, especially by the height h and/or the angle β of the coupling lugs, the total stress, the coefficient of elongation and/or the surface finish of the coupling lips and/or the coupling lugs, wherein the coupling lips are preferably produced without particular tension and/or the mean height of surface irregularities Ra<0.6 μm, especially for the coupling lugs.

The invention also provides a rearview device comprising a side-view mirror and/or a camera which is/are connected to a motor vehicle by an adjustment device, wherein the adjustment device comprises a sliding clutch according to the invention.

The invention is based on the surprising realization that, because of the pure positive fit between the coupling elements of the two plastic parts of a sliding clutch according to the invention, simple changes, for example to the geometry of coupling elements, already render possible an adaptation to a specific intended purpose, namely by adapting the predefined maximum torque up to which the coupling elements of the two plastics rotate with one another because they engage one another.

Various aspects of this invention will become apparent to those skilled in the art from the following detailed description of the preferred embodiment, when read in light of the accompanying drawings.

BRIEF DESCRIPTION OF THE DRAWINGS

FIG. 1a is a perspective view of a first embodiment of a sliding clutch according to the invention.

FIG. 1b is another perspective view of the first embodiment of FIG. 1a.

FIG. 1c is a partial section view of the first embodiment of FIG. 1a.

FIG. 1d is a section view of a coupling element of the first embodiment of FIG. 1a.

FIG. 2b is a partial section view of the second embodiment of FIG. 2a.

DETAILED DESCRIPTION OF THE PREFERRED EMBODIMENT

Figure 1B:
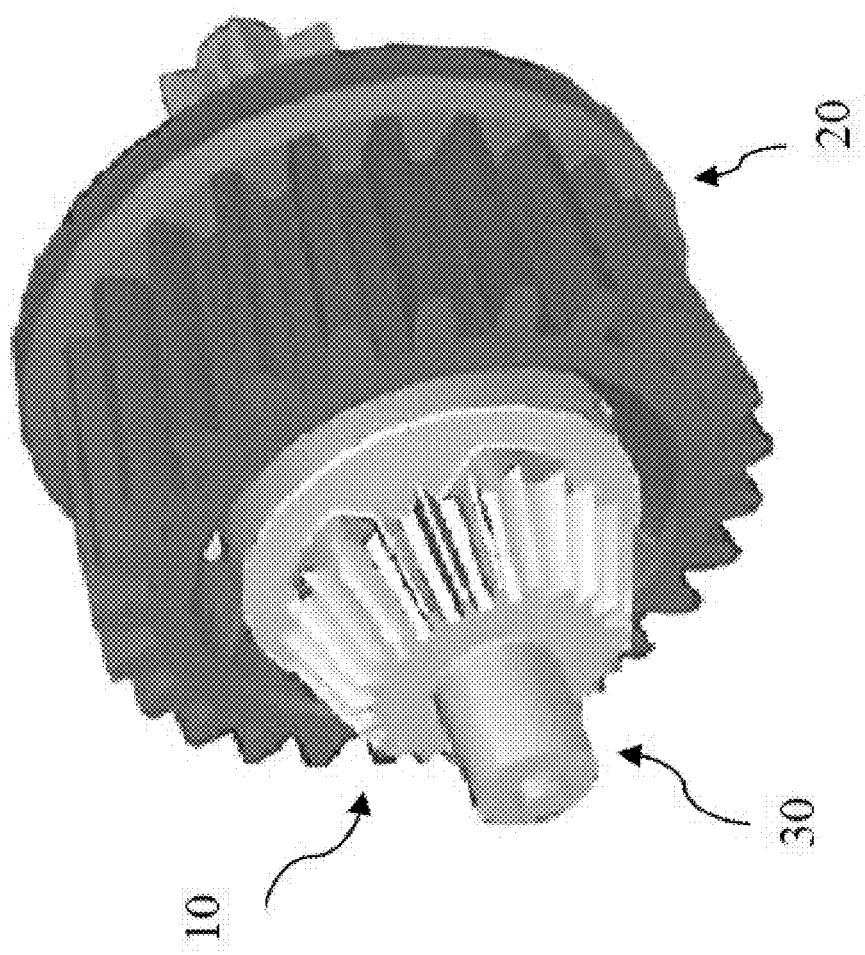
Figure 1C:
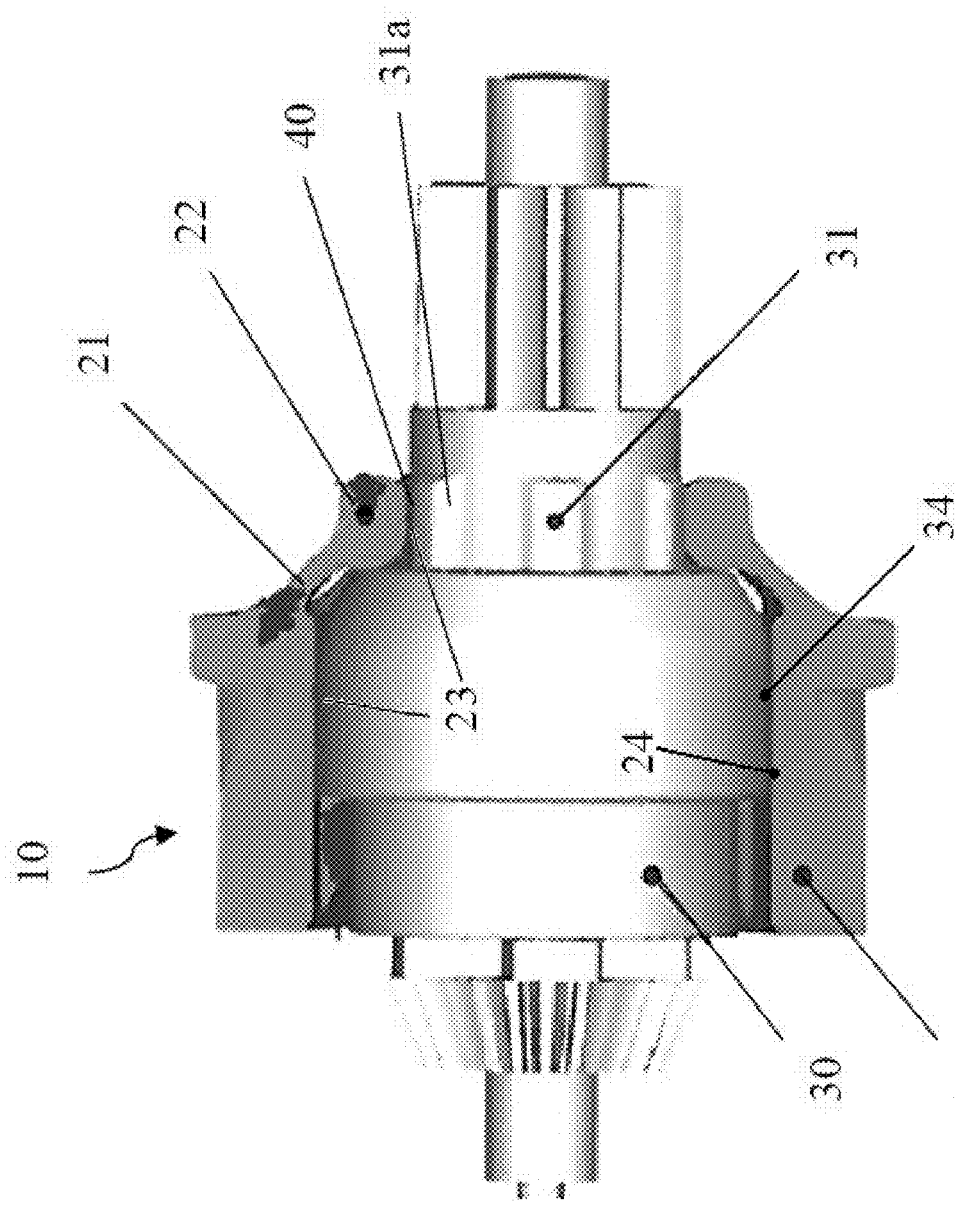

Referring now to the drawings, there is illustrated in FIGS. 1a-1d a first embodiment of a sliding clutch 10 according to the invention, which can be used in an adjustment device of a side-view mirror of a motor vehicle. To this end, the sliding clutch 10 comprises two plastic parts in the form of an external gear wheel 20 and an internal shaft 30. The two plastic parts are preferably produced in a 2K injection molding process and in such a manner that the plastic of the gear wheel 20 has a higher elasticity than the plastic of the shaft 30. The gear wheel 20 is formed by six lips 22 each connected by a bending area 21, whereas lugs 31 are provided on the shaft 30 so that each lip 22 fits between two adjacent lugs 31 in a basic position illustrated in FIG. 1a, and a positive meshing of the lips 22 and lugs 31 arises. The partial section view of FIG. 1c moreover illustrates the area of positive fit 40 between a lip 22 and a lug 31a. The gear wheel 20 includes a first support surface 24 that contacts at least a portion of a second support surface 34 of the shaft 30 as shown in FIG. 1c. The first and second support surfaces 24 and 34 are formed as parts of the gear wheel 20 and the shaft 30, respectively, either through the 2K molding process or as part of a molding process where the shaft is built into the gear wheel.

Figure 1D:
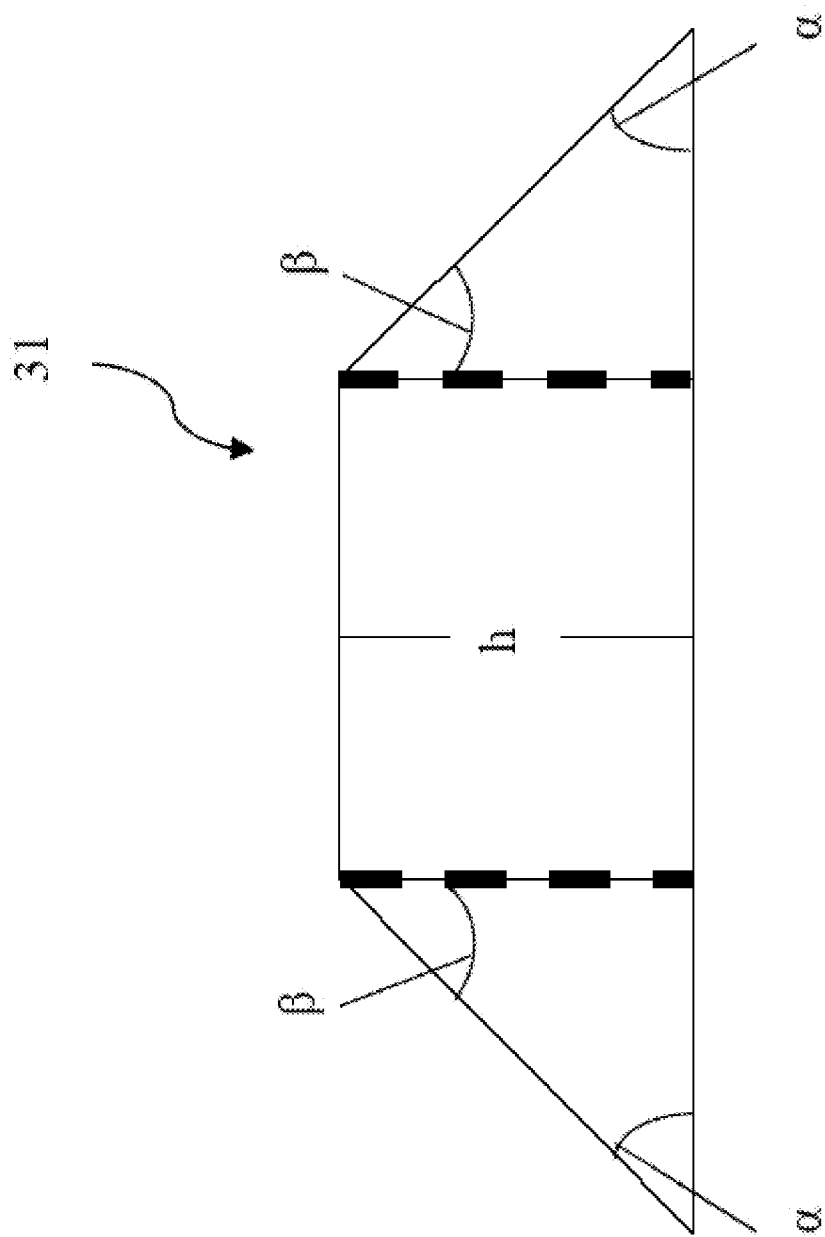

As illustrated in FIG. 1d, the lugs each have a cross section in the shape of an isosceles trapezoid, wherein the height h and the lug flank angles α, β determine the maximum torque at which an engagement of the lips 22 and lugs 31 is present. If this maximum torque is exceeded, the lips 22 slide over the lugs 31 so that an engagement is lost. This "slide-away" is rendered possible by the bending area 21 at each lip 22.

The mean height 23 of surface irregularities Ra of the surfaces of the two plastic parts can be >0.6 μm and be maintained by polishing in order to essentially avoid static friction between the two plastic parts. Moreover, the production of the gear wheel 20 together with the bending areas 21 and lips 22 avoids a particular tension in the lips 22 so that creep torques are negligible.

Thus according to the invention the setting of the maximum torque up to which the two plastic parts rotate with one another essentially depends on the dimensioning of the lugs 31 as well as the elasticity of the bending areas 21.

Figure 2A:
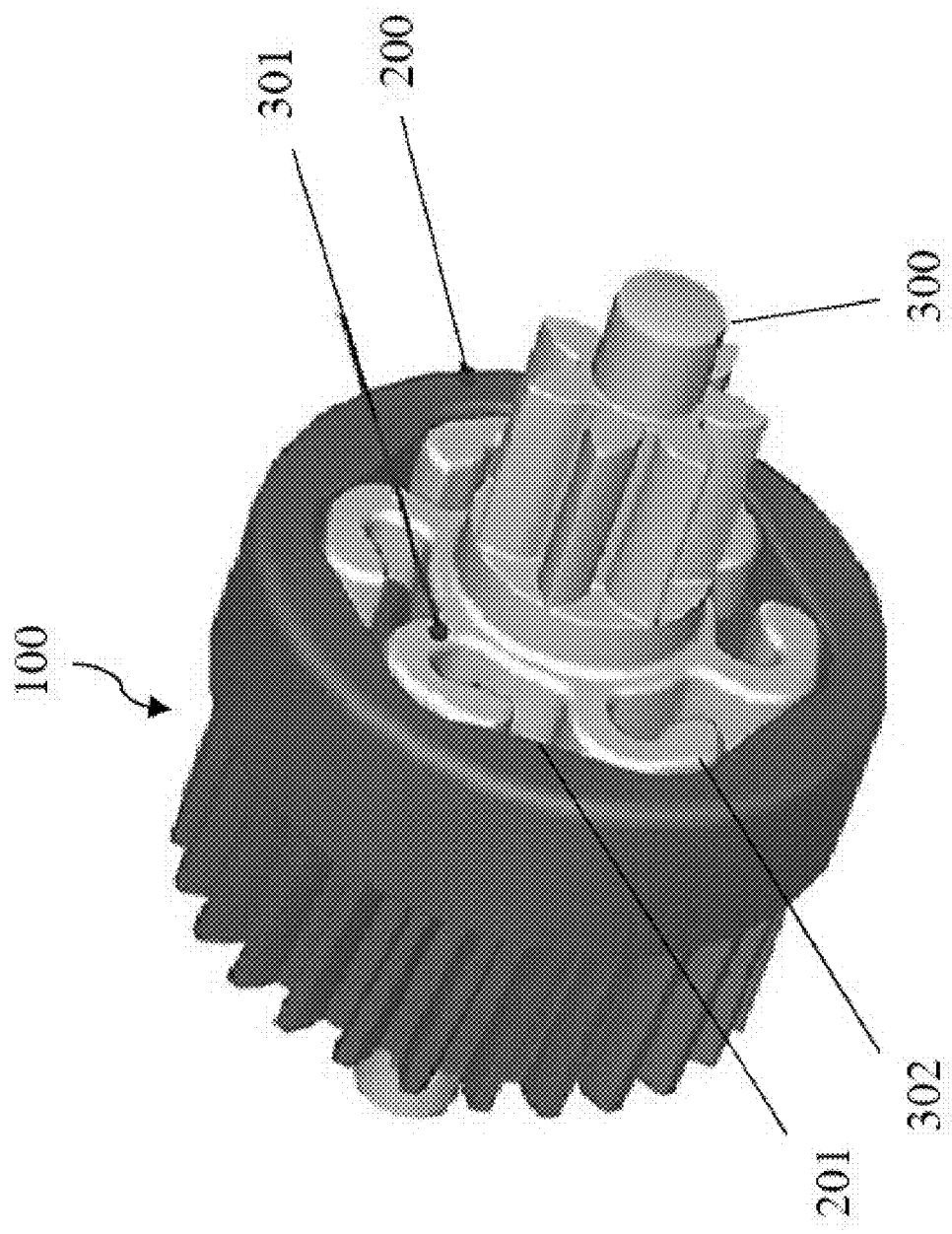
FIG. 2a is a perspective view of a second embodiment of a sliding coupling according to the invention.

FIGS. 2a and 2b illustrate a second embodiment of a sliding clutch 100 according to the invention. This sliding clutch 100 again comprises two plastic parts in the form of an external gear wheel 200 and an internal shaft 300. In distinction to the embodiment of FIGS. 1a to 1d, in the second embodiment the gear wheel 200 comprises lugs 201 whereas the shaft 300 is formed with bending areas 301 and lips 302. The lips 302 again engage in a gap between two adjacent lugs 201, so that in the basic position illustrated in FIG. 2a, a pure positive fit is present between the coupling elements in the form of the lugs 201 and lips 302. The area of positive fit 400 is indicated in the partial section view of FIG. 2b. The external gear wheel 200 includes a first support surface 224 that contacts at least a portion of a second support surface 334 of the shaft 300, similar to the first embodiment of FIG. 1c.

The second embodiment of the invention is characterized by the same advantages as the first embodiment, namely the simple adaptability of the maximum torque up to which the two plastic parts rotate with one another, by the geometry of the lugs 201, which again can have the shape of an isosceles trapezoid in cross section.

The simple adaptability of the sliding clutch to a predefined maximum torque provides high flexibility in the area of application of the sliding clutch according to the invention.

The features of the invention disclosed in the above description, the claims and the drawings can be essential for the realization of the invention in its various embodiments both individually and in any desired combination.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A sliding clutch for an adjustment device of a rearview device of a motor vehicle comprising:
   a first plastic part formed as an external gear wheel having a first multiplicity of first coupling elements; and
   a second plastic part formed as an internal shaft having a second multiplicity of second coupling elements,
   the first and second plastic parts rotate with one another up to a predefined maximum torque and a positive fit exists between the first and second coupling elements up to the predefined maximum torque, and wherein the first plastic part is made of a plastic material having higher elasticity than a plastic material of the second plastic part.

2. The sliding clutch according to claim 1, wherein from 4 to 50 first and/or second coupling elements are provided, and/or the first coupling elements are configured as coupling lugs and the second coupling elements as coupling lips, or the second coupling elements are configured as coupling lugs and the first coupling elements as coupling lips.

3. The sliding clutch according to claim 2, wherein each coupling lip can be arranged between two adjacent coupling lugs with positive fit, and/or each coupling lip is formed on a free end of a bending area or spring area.

4. The sliding clutch according to claim 2, wherein the cross section of each coupling lug has the shape of an isosceles trapezoid of a height, h, and an angle, β, of less than 90° on its free end.

5. The sliding clutch according to claim 2, wherein the predefined maximum torque is determined by a geometry of the coupling lips and/or the coupling lugs, especially by a height, h, and/or an angle, β, of the coupling lugs, a total stress, a coefficient of elongation and/or a surface finish of the coupling lips and/or the coupling lugs, wherein the coupling lips are preferably produced without particular tension and/or with a mean height of surface irregularities Ra<0.6 μm, especially for the coupling lugs.

6. The sliding clutch according to claim 1, wherein the first and second plastic parts are either produced in a mold, preferably in a 2K injection molding process, or the second plastic part is the shaft and is built into the first plastic part configured as the gear wheel.

7. A rearview device comprising a side-view mirror and/or a camera which is/are connected to a motor vehicle by an adjustment device, wherein the adjustment device comprises a sliding clutch according to claim 1.

8. The sliding clutch according to claim 1 wherein the first plastic part has a first support section and the second plastic part has a second support section in contact with the first support section.

9. The sliding clutch according to claim 1, wherein the first and second support surfaces have a mean height of surface irregularities sufficient to avoid static friction between the first and second parts.

10. The sliding clutch according to claim 1, wherein piloting of the first support surface on the second support surfaces avoids misalignment of the first and second parts such that the first coupling elements are generally equally loaded against the second coupling elements.

* * * * *